United States Patent
Mooney

(10) Patent No.: US 7,127,209 B2
(45) Date of Patent: Oct. 24, 2006

(54) METHOD AND SYSTEM FOR PROVIDING ACCURATE SERVICE RECORD USING PHONE LINE DETECTOR

(75) Inventor: Philip D. Mooney, Sellersville, PA (US)

(73) Assignee: Agere Systems Inc., Allentown, PA (US)

( * ) Notice: Subject to any disclaimer, the term of this patent is extended or adjusted under 35 U.S.C. 154(b) by 862 days.

(21) Appl. No.: 09/844,063

(22) Filed: Apr. 27, 2001

(65) Prior Publication Data

US 2002/0160712 A1    Oct. 31, 2002

(51) Int. Cl.
    *H04B 7/00* (2006.01)
(52) U.S. Cl. .................. 455/41.2; 455/41.3; 455/557; 455/418; 375/219; 375/220; 379/28
(58) Field of Classification Search ............... 455/41.2, 455/41.3, 557, 418, 419, 420; 375/272, 219, 375/220, 356; 370/252, 310; 379/28
See application file for complete search history.

(56) References Cited

U.S. PATENT DOCUMENTS

| | | | | |
|---|---|---|---|---|
| 5,815,682 A | * | 9/1998 | Williams et al. | 703/25 |
| 6,173,040 B1 | * | 1/2001 | Wang | 379/21 |
| 6,456,703 B1 | * | 9/2002 | Lee | 379/93.09 |
| 6,546,091 B1 | * | 4/2003 | Wehmeyer et al. | 379/93.29 |
| 2001/0033554 A1 | * | 10/2001 | Ayyagari et al. | 370/328 |
| 2002/0118735 A1 | * | 8/2002 | Kindred | 375/222 |

OTHER PUBLICATIONS

Bluetooth Tutorial—Profiles (pp. 1-4), downloaded from palowireless.com.

* cited by examiner

Primary Examiner—Matthew D. Anderson
Assistant Examiner—Sanh Phu

(57) ABSTRACT

A method and system for providing an accurate service record to communication devices seeking modem-based services. The system includes a phone line detector capable of detecting whether a properly working phone line connection exists. This can be accomplished by detecting whether a phone line is actually plugged into a phone jack connected to a modem of a communication device. If a proper phone line connection exists, then the communication device generates a service record identifying, among other services, all modem-based services that the communication device can offer to other communication devices in search of a modem or modem-based service.

31 Claims, 2 Drawing Sheets

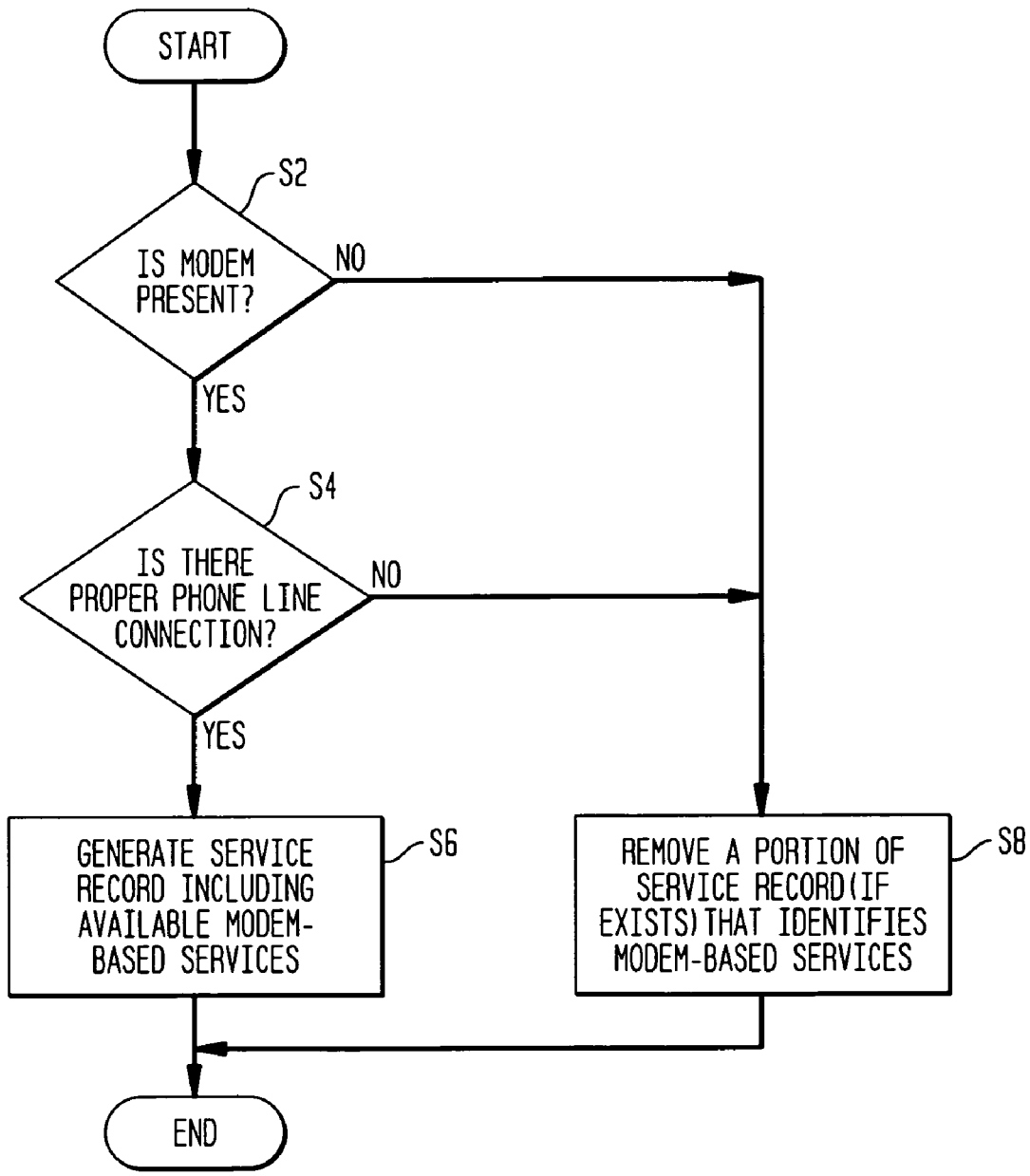

METHOD AND SYSTEM FOR PROVIDING ACCURATE SERVICE RECORD USING PHONE LINE DETECTOR

BACKGROUND OF THE INVENTION

1. Field of the Invention

The present invention relates to communications systems and, more particularly, a method and system for providing an accurate service record to a communication device using a phone line detector.

2. Discussion of the Related Art

Bluetooth technology is a well-known technology developed to standardize data communication between disparate communication devices. This technology allows communication devices having Bluetooth devices therein to communicate with each other without the use of cables or connectors. The communication devices can be laptops, desktops, handhelds, PDAs (personal digital assistants), mobile phones, two-way pagers, etc. The Bluetooth communication that occurs between the communication devices is short-range wireless communication and does not require the use of a wireless cellular network A typical Bluetooth device includes both hardware (e.g., antenna, transmitter, receiver, etc.) and software for implementing the short-range wireless communication. Each Bluetooth device is configured according to predetermined Bluetooth standards and protocols so that short-range wireless communication between two selected communication devices and/or multiple selected communication devices is possible. Further information regarding the Bluetooth standards, protocols and technology is available at the website of http://www.Bluetooth.com.

One of the unique features that is offered by Bluetooth technology is that a particular communication device that does not have a modem or does not want to use its own modem (if it has the modem), is able to "borrow" the use of a modem in another communication device through the Bluetooth devices in these communication devices. This borrowing is facilitated by the operation of a Service Discovery Protocol installed on the Bluetooth devices of these communication devices. The Service Discovery Protocol is a required part of the software installed in a conventional Bluetooth device.

The conventional Bluetooth device is also installed with different application programs, one of which utilizes the Service Discovery Protocol to configure the communication device to keep a list of all services which that communication device can offer to other communication devices that may need to utilize such services. This list of services is known as a "service record". The services identified in the service record can include modem-based services (i.e., services that utilize a modem), such as a Dial-up Networking Gateway service, a fax service, etc., and non-modem based services such as a LAN (Local Area Network) access service, a synchronization service, a file transfer service, etc. A detailed discussion of each of these services is provided at the website of http:/www.palowireless.com/infotooth/tutorial/profiles.asp. If a particular communication device does not include a modem and is in need of a modem-based service, or if the particular device includes a modem but the use of its own modem may not be allowed or desired (e.g., the use of its own modem may be costly if the communication device is a mobile phone), then the Service Discovery Protocol installed in that communication device initiates communication with other communication devices within the Bluetooth range, and requests the service record from these other communication devices. The communication device receiving the service records then may select and use, if allowed, the modem-based services offered by these other communication devices through the use of the modem in these other communication devices.

FIG. 1 is a block diagram of a conventional communication system 50 in which a communication device provides its service record to another communication device through Bluetooth devices according to known techniques. As shown in FIG. 1, the system 50 includes a first communication device 10 including a Bluetooth device 12 and a processor 11, operatively coupled. The first communication device 10 may or may not include a modem therein. The system 50 further includes a least one second communication device 20 including a Bluetooth device 22, a modem 13, a phone jack 14, and a phone line 15 inserted into the phone jack 14, all operatively coupled. Each of the first and second communication devices 10 and 20 can be a PDA, a laptop computer, a desktop computer, a mobile phone, etc., and includes components that are typically found in these devices such as a display unit, an input unit such as a keyboard or keypad, memory, processor, etc. Each of the Bluetooth devices 12 and 22 includes a Service Discovery Protocol and an application program that utilizes the Service Discovery Protocol as discussed above.

The Service Discovery Protocol in the Bluetooth device 22 of the second communication device 20 stores a service record identifying a list of all services, including modem-based services, that the second communication device 20 can offer to other communication devices in need of modem-based services. In some conventional systems, a communication device generates a service record after it verifies that a modem exists in that communication device.

When the first communication device 10 is in need of a modem that provides a modem-based service such as the Dial-up Networking Gateway service for dialing-out to the Internet (e.g., because the device 10 does not have its own modem, or if it has, the use of its own modem is not allowed or desired), the Service Discovery Protocol in the Bluetooth device 12 of the first communication device 10 initiates short-range wireless communication 30 with any of the communication devices located within the appropriate range to determine if any of the neighboring communication devices is capable of providing modem-based services. In response to this request from the first communication device 10, the Bluetooth device 22 in the nearby second communication device 20 transmits a message back to the first communication device 10. This message contains the appropriate service record of the second communication device 20.

The Bluetooth device 12 receives this message and sends the service record to the processor 11. The processor 11 then displays the service record on an associated display unit for viewing by the user of the first communication device 10. The user views the service record, including a list of modem-based services that are offered by the second communication device 20. The user can select one of the listed modem-based services, or the first communication device 10 can be configured to select automatically a particular service according to some predetermined criteria. If multiple communication devices respond to the first communication device 10's request for the service record and the first communication device 10 receives multiple service records, then the user may select one of the received service records and further select a particular modem-based service from the selected service record.

If the user selects one of the modem-based services offered by the second communication device 20, the Bluetooth device 12 of the first communication device 10 communicates this selection to the Bluetooth device 22 of the second communication device 20. Then, through the Bluetooth devices 12 and 22, the first communication device 10 initiates the selected service using the modem 13 of the second communication device 20 according to known techniques (e.g., using AT commands). In this manner, a communication device in need of a modem is able to connect to a network such as the Internet through a modem of another communication device via Bluetooth short-range wireless communication, and access any of the modem-based services offered by the communication device having the modem.

A problem exists, however, with the conventional method of providing a service record to communication devices. A conventional Bluetooth device is configured to generate a service record either automatically or only when it determines that a modem is present in the communication device. But, even if the modem is present, the modem may not be actually connected to a working phone line, in which case the communication device is not at that time capable of providing the modem-based services listed on the service record. Thus, the conventional Bluetooth device often provides the service record to other communication devices when in fact it is not capable of actually performing the services identified on the service record. Relying on this information, the first communication device will attempt to dial out using the modem of the second communication device. But, since a working phone line is not actually connected to the modem in the second communication device, this attempt will fail and the first communication device will need to look for another device capable of providing the modem-based services. Therefore, the conventional communication system can result in a waste of time and resources.

Accordingly, there is a need for an improved communication system and method for providing accurate service records to communication devices, which overcomes the problems of the conventional communication devices and methods for providing service records.

SUMMARY OF THE INVENTION

The present invention provides a method and system for providing an accurate service record to communication devices seeking modem-based services. Particularly, the present invention includes a phone line detector capable of detecting whether a properly working phone line connection exists in a communication device. This can be accomplished by detecting whether an available phone line is actually plugged into a phone jack connected to a modem of the communication device. If a proper phone line connection exists, then the communication device generates a service record including a list of all available modem-based services that the communication device can offer to other communication devices in need of a modem. This allows a distribution of an accurate service record to communication devices seeking modem-based services, so that valuable time and resources are not wasted by attempting to dial out when there is no proper phone line connection to the modem.

BRIEF DESCRIPTION OF THE DRAWINGS

FIG. 3 is a flow chart illustrating the processing steps of a method for providing an accurate service record to communication devices according to one embodiment of the present invention.

DETAILED DESCRIPTION OF THE PREFERRED EMBODIMENTS

Figure 1:
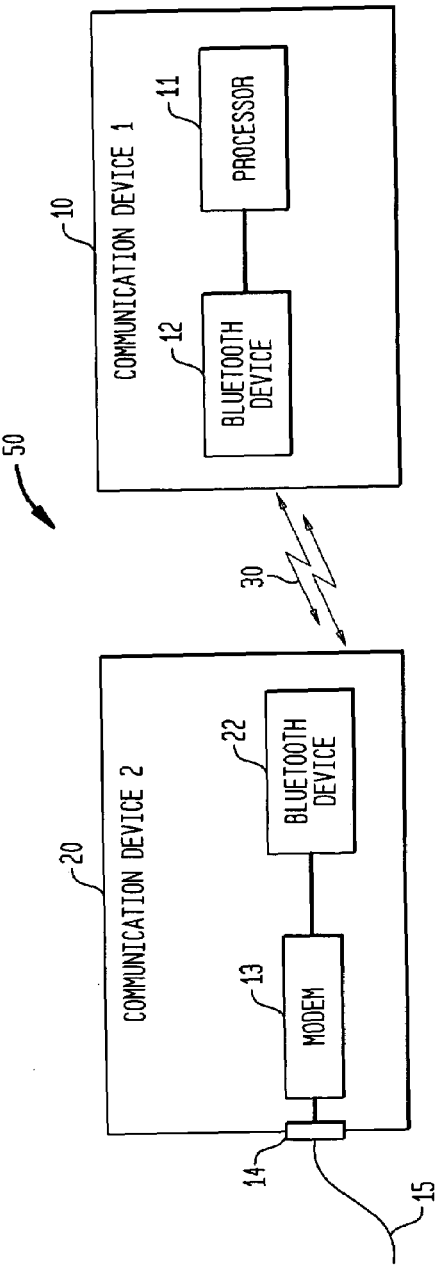
FIG. 1 is a block diagram of a conventional system for providing a service record to communication devices.

In the drawings, the same reference numerals are used to designate the same components.

Figure 2:
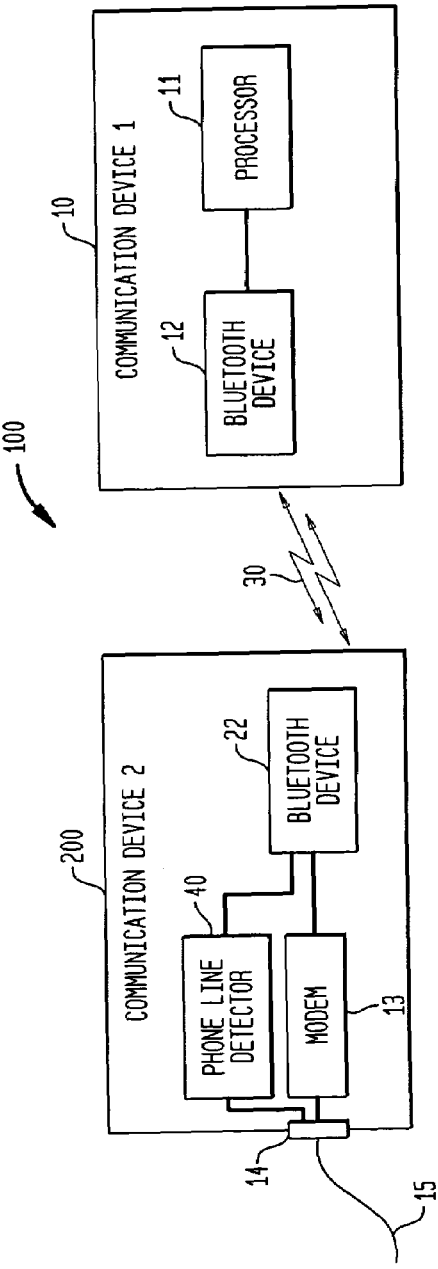
FIG. 2 is a block diagram of a communication system for providing an accurate service record to communication devices according to one embodiment of the present invention.

FIG. 2 is a block diagram of a system 100 for providing an accurate service record to communication devices according to one embodiment of the present invention. As shown in FIG. 2, the system 100 includes a first communication device 10 capable of performing short-range wireless communication 30 with at least one second communication device 200 located within a predetermined range of the first communication device 10. The first communication device 10 includes a Bluetooth device 12 and a processor 12, operatively coupled. The second communication device 200 includes a Bluetooth device 22, a modem 13, a phone line 15 connected to the modem 13 through a phone jack 14, and a phone line detector 40, all operatively coupled.

The phone line detector 40 detects whether the phone line 15 is properly attached to the modem 13 or whether the phone line 15 is actually present in the phone jack 14. The phone line detection by the phone line detector 40 can be accomplished in a variety of different ways. For example, one simple way to accomplish this is to determine whether or not the phone line 15 is actually plugged into the phone jack 14. This detection can be made using, for example, optical sensors, switches, etc. which may be actuated or triggered when the phone line 15 is physically connected in the phone jack 14, or by using any other known detection devices or techniques. In another example, the determination of whether a proper phone line connection exists in the second communication device 200 can be made by detecting a voltage difference between two phone wires (also known as "tip and ring"). Generally, the voltage difference of 48 volts will be present between tip and ring if the phone line is properly plugged into the phone jack 14 and no one is using the phone.

Examples of modem-based services may include, but are not limited to, a Dial-up Networking Gateway service, a fax service, etc. The Dial-up Networking Gateway service allows the first communication device 100 to dial-up a network such as the Internet through the modem 13 of the second communication device 200, so that the user can access any website on the Internet and download these web pages to a display device in the first communication device 10. The fax service allows the first communication device 10 to transmit or receive fax messages or documents through the modem 13 and the Bluetooth device 22.

If the phone line detector 40 detects that there is a proper phone line connection for the second communication device 200, the Bluetooth device 22 generates a service record identifying, among other services, all the modem-based services that can be offered by the second communication device 200. The service record then can be transmitted to the first communication device 10 when the first communication device 10 requests for any service record from nearby communication devices capable of providing modem-based services.

FIG. 3 is a flowchart illustrating the processing steps of a method of providing an accurate service record to communication devices according to one embodiment of the present invention. These processing steps can be implemented in the second communication device 200 of the system 100 shown in FIG. 2, and can be repeated continuously or on a regular basis to provide always an accurate service record. As shown in FIG. 3, the Service Discovery Protocol in the Bluetooth device 22 of the second communication device 200 determines whether a modem 13 is present in the second communication device 200 in Step S2. If the determination results indicate that the modem 13 is present, the Service Discovery Protocol in the Bluetooth device 22 further determines whether there is a proper phone line connection to the modem 13 in Step S4. This detection can be made based on the detection results of the phone line detector 40. Step S4 can be implemented by detecting the presence of a phone line in the phone line jack 14 and/or detecting whether the phone line in the phone jack 14 is available for use. If the determination results at Step S4 indicate that the proper phone line connection exists, the Service Discovery Protocol of the second communication device 200 generates in Step S6 a service record identifying, among other services, all available modem-based services which can be offered by the second communication device 200 to other communication devices in need of such services.

On the other hand, if the determination results at Step S2 indicate that the modem is not present in the second communication device 200 or if the determination results at Step S4 indicate that a proper phone line connection does not exist in the second communication device 200, and if the service record has been generated previously, then the second communication device 200 is configured to remove a portion of the existing service record that identifies the modem-based services at Step S8 (i.e., the list of modem-based services is removed from the service record), so that an accurate service record can be transmitted to nearby communication devices seeking modem-based services. In one embodiment, the Bluetooth device in the second communication device can be configured to send a message to the first communication device when the phone line detector indicates that there is no proper phone line connection for the second communication device. This message would indicate to the first communication that there is no proper phone line connection in the second communication device.

The concept of detecting a proper phone line connection and updating a service record based on such a detection to provide an accurate service record can be applied in other services offered by the communication device that may not be modem-based services. Such variations are contemplated as part of the present invention. For example, many conventional communication devices offer a LAN access service to other nearby communication devices, so that the nearby communication devices can access a LAN, if desired, by using the service offering communication device as a LAN access point. This is accomplished through the use of Bluetooth devices in the communication devices and a LAN access device such as a LAN access card that is well known in the art. The LAN access service is typically identified in the service record if it is available. In such systems, a connection detector (functioning like the phone line detector 40) may be provided near a HUB/switch (which controls the LAN access communication) so that it can detect whether a proper cable or other line connection exists to the HUB. This can be accomplished, for example, by detecting whether the cable is physically connected to the HUB or by detecting the presence of a carrier signal in the cable connected to the HUB. If no proper connection exists, then the service record is updated to remove a LAN access service from the list. But if a proper connection exists, then the service record identifying the LAN access service is generated which can be transmitted to communication devices seeking the LAN access service. In this manner, an accurate service record can be provided to any communication device seeking the LAN access service.

Although the use of the present invention in devices capable of Bluetooth wireless communication has been described hereinabove, the present invention is equally applicable to any other "ad-hoc" wireless network systems such as a system using a wireless Ethernet according to IEEE standard 802.11, or "ad-hoc" wired networks such as UPnP (Universal Plug and Play).

The processing steps of the present invention can be implemented by computer programs in conjunction with known hardware devices, e.g., a microprocessor or other processing device. Software programming code which embodies the present invention can be stored in storage of some type. The software programming code may be embodied on any of a variety of known media such as a diskette, or hard drive, or CD-ROM, and may be distributed on such media. The techniques and methods for embodying software program code on physical media and/or distributing software code are known in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for providing an accurate service record from a second communication device to at least one first communication device, the method comprising the steps of:
   first determining whether a modem is present in the second communication device;
   second determining whether a proper phone line connection exists in the second communication device; and
   generating, by the second communication device, a service record identifying modem-based services that can be offered by the second communication device to the first communication device, based on the results of the first and second determining steps, wherein the service record identifying the modem-based services is generated if the first determining step determines that the modem is present in the second communication device, and if the second determining step determines that a proper phone line connection exists in the second communication device.

2. The method of claim 1, further comprising:
   communicating the service record from the second communication device to the first communication device using short-range wireless communication techniques.

3. The method of claim 2, wherein the communicating step is implemented by Service Discovery Protocol installed in the first and second communication devices.

4. The method of claim 2, wherein the short-range wireless communication techniques include Bluetooth communication techniques.

5. The method of claim 1, wherein the second determining step includes:
   detecting whether a phone line is plugged into a phone jack connected to the modem of the second communication device.

6. The method of claim 1, wherein the second determining step includes:
   determining a voltage difference between wires of a phone line connected to the modem of the second communication device.

7. The method of claim 1, wherein, once the service record is generated, the first and second determining steps are repeated, and if the second determining step determines that a proper phone line connection does not exist currently in the second communication device, then the method further comprises:
   removing a portion of the service record that identifies the modem-based service.

8. The method of claim 1, further comprising:
   generating a message informing the first communication device that there is no proper phone line connection when the second determining step determines that no proper phone line connection exists in the second communication device.

9. The method of claim 1, wherein the modem-based services include at least one of the following: a Dial-up Networking Gateway service and a fax service.

10. A method of providing an accurate service record identifying services that can be offered by a communication device, the method comprising the steps of:
    determining whether a proper line connection for providing services exists for the communication device; and
    generating a service record identifying the services if the determining step determines that a proper line connection exists, and removing the services from the service record if the determining step currently determines that no proper line connection exists for the communication device.

11. The method of claim 10, wherein the services are modem-based services and the line connection is a phone line connection to a modem in the communication device.

12. The method of claim 11, further comprising:
    determining whether the modem exists in the communication device; and
    generating the service record if the modem exists in the communication device and the proper line connection exists for the communication device.

13. The method of claim 10, wherein the services include a LAN access service.

14. A communication device for providing an accurate service record identifying services that can be offered by the communication device, the communication device comprising:
    a line detector for determining whether a proper line connection for providing services exists for the communication device; and
    communication means, coupled to the line detector, for generating a service record identifying the services only if the line detector indicates that a proper line connection exists.

15. The communication device of claim 14, wherein, once the service record is generated, the communication means removes the services from the service record if the line detector currently indicates that no proper line connection exists for the communication device.

16. The communication device of claim 14, wherein the services are modem-based services and the line detector is a phone line detector.

17. The communication device of claim 16, wherein the communication means determines whether a modem exists in the communication device, and generates the service record if the modem exists in the communication device and the phone line detector determines that a proper phone line connection exists for the communication device.

18. The communication device of claim 14, wherein the services include a LAN access service.

19. The communication device of claim 14, wherein the communication means includes a Bluetooth device.

20. A second communication device for providing an accurate service record to a first communication device, the second communication device comprising:
    a modem;
    a Bluetooth device, coupled to the modem, for determining whether the modem is present in the second communication device; and
    a phone line detector, coupled to the Bluetooth device, for determining whether a proper phone line connection exists in the second communication device,
    wherein the Bluetooth device generates a service record identifying modem-based services that can be offered by the second communication device to the first communication device, only if the modem is present in the second communication device and the proper phone line connection exists in the second communication device.

21. The second communication device of claim 20, wherein the Bluetooth device is installed with a Service Discovery Protocol.

22. The second communication device of claim 20, the phone line detector detects whether a phone line is plugged into a phone jack connected to the modem of the second communication device.

23. The second communication device of claim 20, wherein the phone line detector detects a voltage difference between wires of a phone line connected to the modem of the second communication device.

24. The second communication device of claim 20, wherein, once the service record is generated, the Bluetooth device removes a portion of the service record that identifies the modem-based services from the second communication device if the Bluetooth device determines that there is no proper phone line connection currently in the second communication device.

25. The second communication device of claim 20, wherein the Bluetooth device generates a message informing the first communication device that there is no proper phone line connection when the Bluetooth device determines that no proper phone line connection exists in the second communication device.

26. The second communication device of claim 20, wherein the modem-based services include at least one of the following: a Dial-up Networking Gateway service, and a fax service.

27. A computer program product embodied on computer readable media readable by a communication device, for providing an accurate service record by the communication device, the computer program product comprising computer executable instructions for:
    determining whether a proper line connection for providing services exists for the communication device; and
    generating a service record identifying the services only if it is determined that the proper line connection exists.

28. The computer program product of claim 27, further comprising computer executable instructions for:
    once the service record is generated, removing the services from the service record if it is determined that no proper line connection exists for the communication device.

29. The computer program product of claim 27, wherein the services are modem-based services and the line connection is a phone line connection to a modem in the communication device.

30. The computer program product of claim 29, further comprising computer executable instructions for:
    determining whether the modem exists in the communication device; and
    generating the service record if the modem and the proper phone line connection exist in the communication device.

31. The computer program product of claim 27, wherein the services include a LAN access service.

* * * * *